April 13, 1948.  T. M. JABLON  2,439,390
SLIDE MOUNTING
Filed Jan. 29, 1945  6 Sheets-Sheet 1
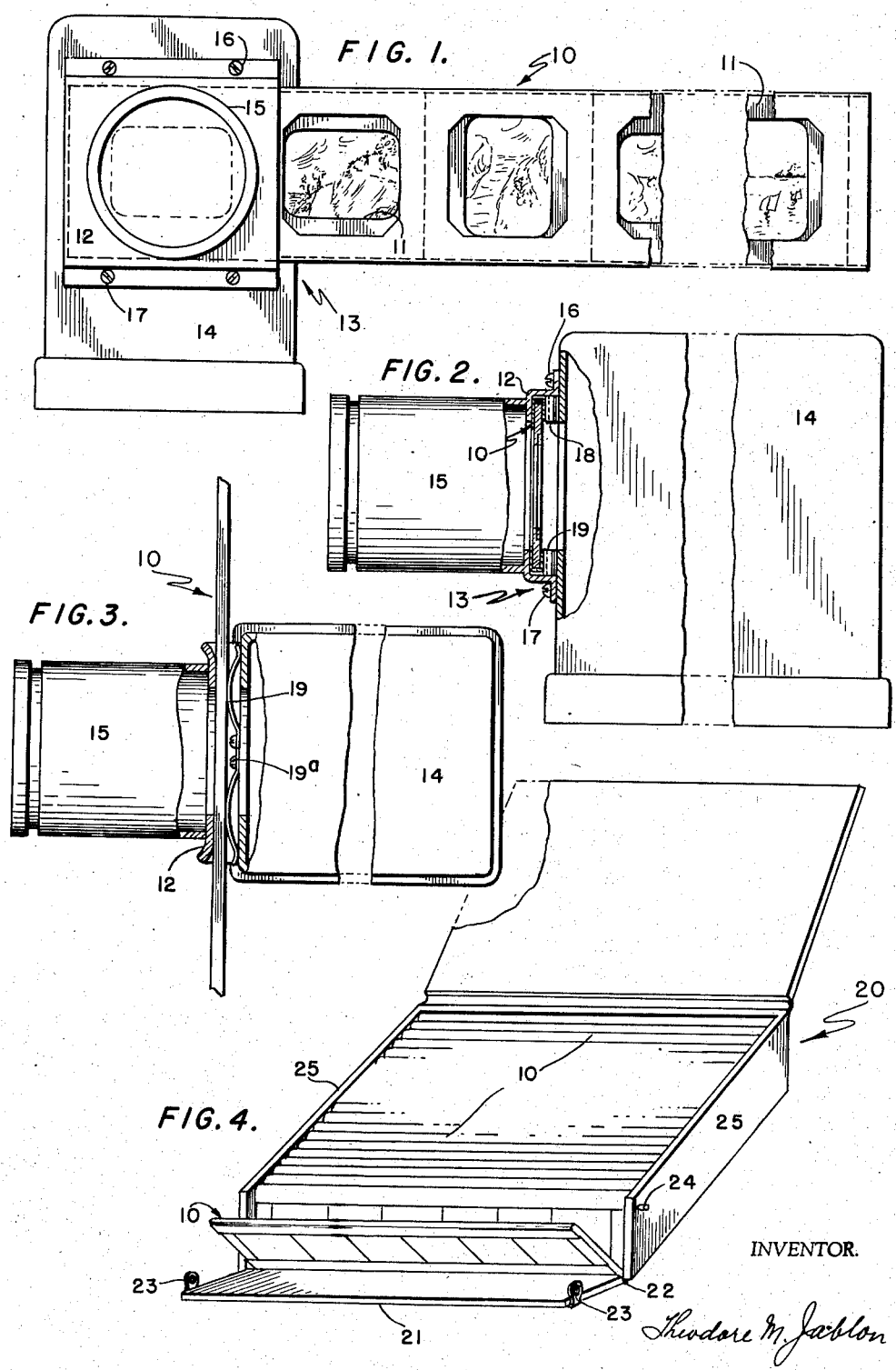
INVENTOR.
Theodore M. Jablon April 13, 1948. T. M. JABLON 2,439,390
SLIDE MOUNTING
Filed Jan. 29, 1945 6 Sheets-Sheet 2
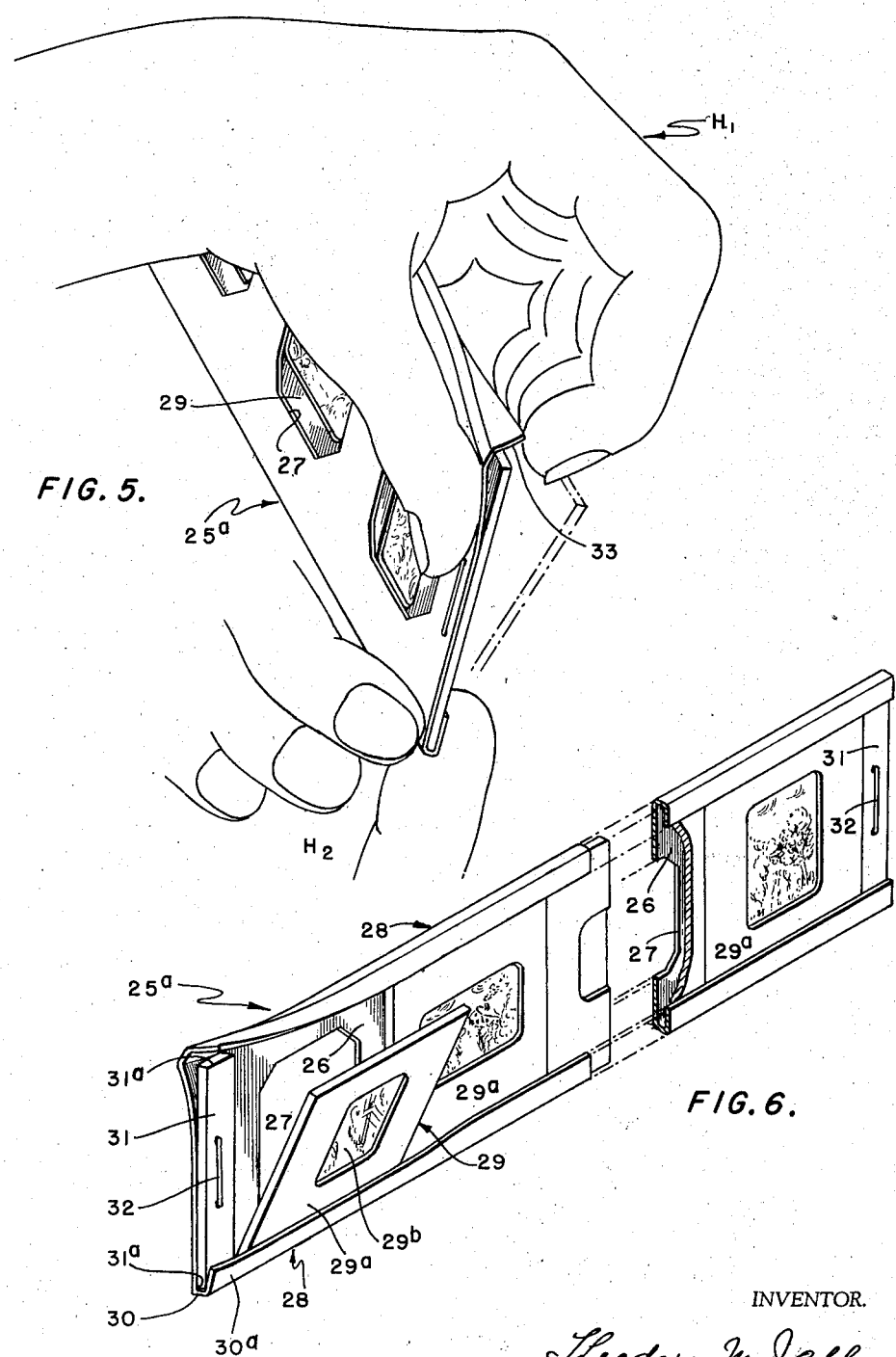
INVENTOR.
Theodore M. Jablon

INVENTOR.

Theodore M Jablon

April 13, 1948.  T. M. JABLON  2,439,390
SLIDE MOUNTING
Filed Jan. 29, 1945  6 Sheets-Sheet 5
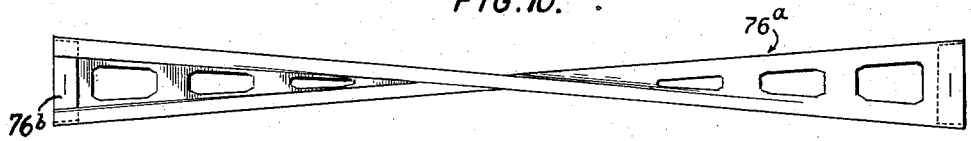
FIG.10.
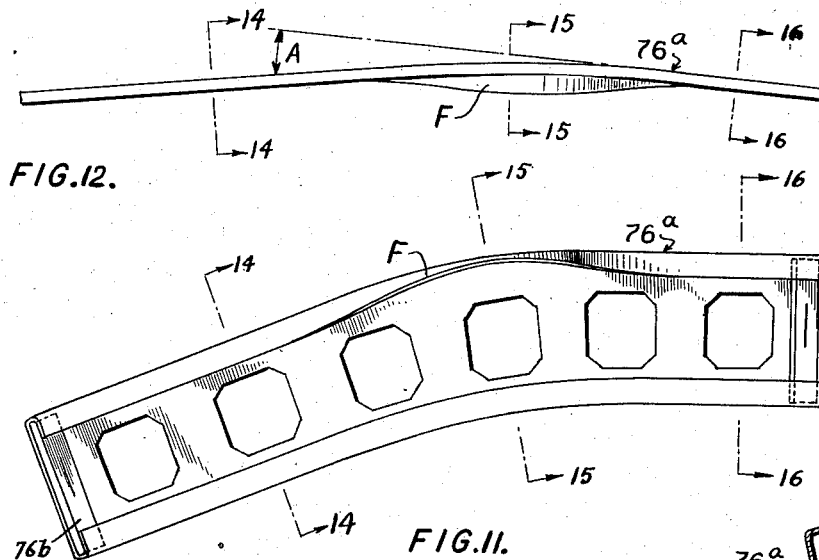
FIG.12.
FIG.11.
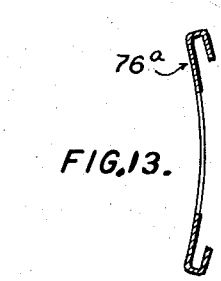
FIG.13.
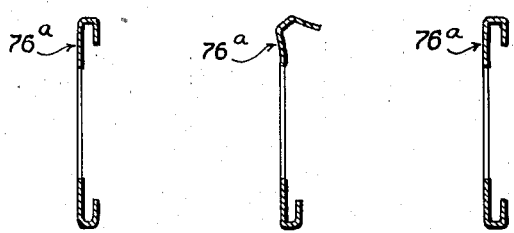
FIG.14.  FIG.15.  FIG.16.
INVENTOR.
Theodore M. Jablon April 13, 1948.  T. M. JABLON  2,439,390
SLIDE MOUNTING
Filed Jan. 29, 1945  6 Sheets-Sheet 6
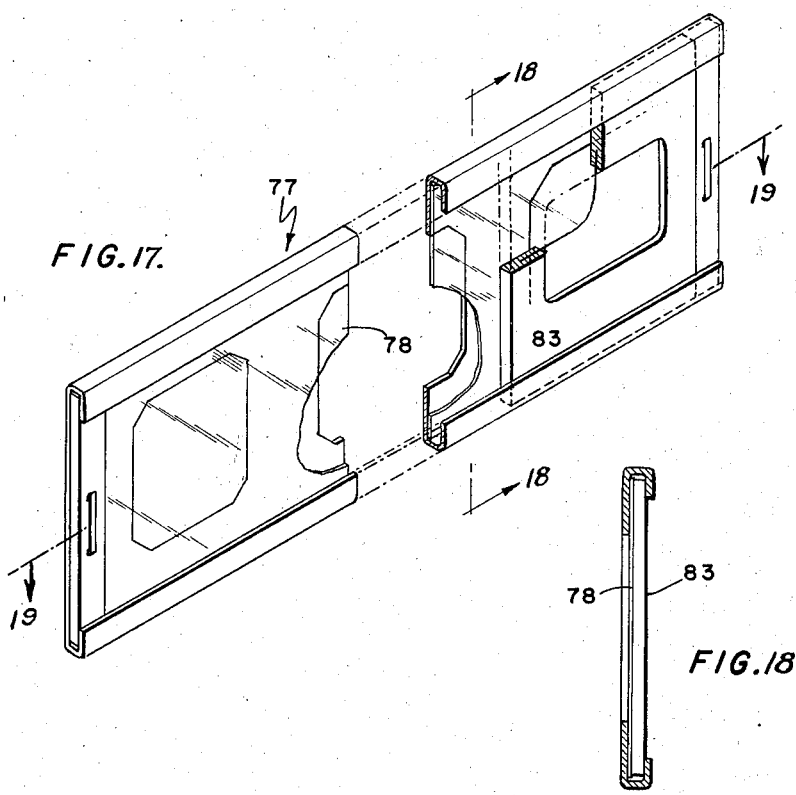
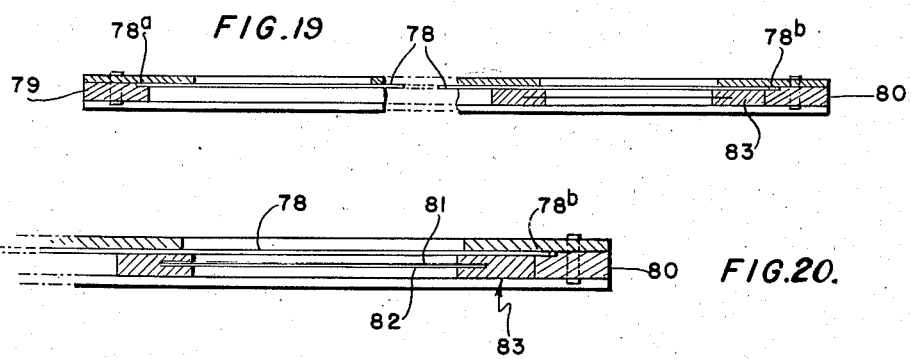
INVENTOR.
Theodore M. Jablon Patented Apr. 13, 1948

2,439,390

UNITED STATES PATENT OFFICE 2,439,390

SLIDE MOUNTING

Theodore M. Jablon, Elmhurst, Long Island, N. Y.

Application January 29, 1945, Serial No. 574,991

17 Claims. (Cl. 40—152)

1

This invention relates to holders or mountings for slides or transparencies, adapted for insertion in projectors or viewers.

Ordinarily slide or transparency holders for still projectors are of the shuttle type, that is a twin frame or twin pocket type which has a pair of pockets to receive a pair of slides side by side. In operation the holder is shuttled in such a manner that the two frame openings are alternatingly placed into the light path of the projector in such a manner that, while one of the slides is being projected, the other or companion slide may be exchanged for a new one which then in turn is moved into the light path, allowing the other slide which has just been projected to be exchanged for a new one.

Such customary arrangement therefore requires constant exchanging and handling of the individual transparencies. For instance the standard 35 mm. color film transparencies taken with the so-called miniature cameras are awkward to handle in this manner, since they are usually supplied in standard 2" x 2" cardboard mountings or frames in which the emulsion side of the film transparency is exposed and unprotected.

In order to avoid such drawbacks of the shuttle type holders and for the protection of the transparencies, this invention proposes to assemble a row of mounted transparencies or frames in a striplike holder or slide mounting adapted to facilitate the handling as well as the storage of the transparencies. That is to say, the transparencies themselves remain in this mounting which is fed stepwise through the projector to expose a sequence of transparencies or picture frames or slides to the path of light, which may be followed by other such picture strips or prepared slide assemblies to be passed through the projector or viewer in the course of a presentation. A collection of such picture strips can be assembled in a suitable container to constitute a slide "library."

This mounting or holder strip when loaded will herein be called a picture strip or mounted slide assembly, while the individual slides or frames or transparencies shall herein briefly be called slides. The holder strip represents the slide mounting per se as distinguished from the picture strip or mounted slide assembly.

It is among the objects of this invention to provide a slide mounting for holding a plurality or row of assembled transparencies, which is compact and simple, light and inexpensive, and which has a smooth as well as pleasing exterior.

2

More specifically expressed one object is to provide a slide mounting which at a minimum length will accommodate a given number of slides and which permits individual slides to be conveniently removed from or inserted into the mounting.

Another object is to provide a slide mounting into which the slides can be placed and from which they can be removed conveniently and rapidly, and yet in which they are securely held.

Still another object is to provide an assembly or collection of slides or a slide "library" of great over-all compactness.

In order to attain these objects, this invention provides a slide mounting or holder in which the slides are retained in and by groove forming longitudinal edge portions providing overhangs. This slide mounting is in the form of a sheath of resiliently flexible filmlike material holding a plurality of slides which adjoin one another edge to edge and are held in place within the mounting by longitudinal edge portions in the form of retaining grooves together with stop means provided at each end of the sheath. The filmlike character of the material is such as to render the sheath sufficiently deformable to allow a portion of the length of the overhang to be sufficiently flexed outwardly to permit a slide to be inserted into or released from the sheath across the edge portions.

Some features reside in the characteristics of the slide holder or mounting per se, others reside in characteristics which become apparent incident to the assembly of the slides in the holder strip, and therefore reside in the mounted assembly of the slides or combination of the slides with the holder strip.

Some features reside in the stop means or end-confining means of the strip.

It should be understood that the stop means or end confining means or -members or -portions can be used in any combination in the strip. That is to say, one kind or embodiment of such confining means can be provided at one end, and another kind at the other end of the strip.

Another feature lies in the assembly of the holder strip with the slides, that is in the conjoint effect that results from that assembly. Accordingly, since the sheath represents a relatively thin-walled structure of filmlike resiliently flexible material it has little rigidity or firmness of its own. However, with the slides inserted in the sheath the assembly assumes a degree of stiffness significantly greater than that of the empty sheath.

In embodying this invention a non-bulky thin-walled sheath can be produced or formed from a suitable plastic sheet material such as cellulose acetate which is thermoplastic, or others. Such materials are basically of a transparent nature or "clear." The holder strip thus produced may be over flexible or limp when empty to a degree depending upon the degree of thinness or the kind of sheet material chosen, but it acquires firmness and straightness once the slides have been placed therein in closely confined and edgewise adjoining relationship to one another. The resulting smooth-edged picture strip is extremely compact and of simple and pleasing appearance. A collection of such picture strips will total up to a "library" having a minimum of space requirement.

The invention possesses other objects and features of advantage, some of which with the foregoing will be set forth in the following description. In the following description and in the claims, parts will be identified by specific names for convenience. In the accompanying drawings there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which:

Figures 1 to 3 show the picture strip when used in a still projector; Fig. 1 being a front view of a projector with the picture strip inserted; Fig. 2 being a side view of the projector with parts broken away to expose the insertion picture strip; Fig. 3 being a top view of the projector with parts broken away to expose the inserted picture strip and spring positioning means therefor.

Fig. 4 shows a collection of picture strips assembled in a "library."

Figures 5 and 6 are perspective views of the holder strip loaded with slides and embodying one kind of stop means, illustrating the manipulation of the strip with respect to the insertion and removal of an end slide incident to resilient deformation of the strip.

Figures 10, 11, 12 illustrate flexed or deformed conditions of the holder strip, Fig. 10 showing an axially twisted condition, Figures 11 and 12 showing deformations due to outward flexure of the edge portion.

Fig. 13 is a cross-section of the holder strip showing transverse deformation thereof.

Figures 14, 15, 16 are cross-sections taken upon the lines 14—14, 15—15, 16—16 in Figures 11 and 12.

Figure 17 is a perspective view showing the holder strip provided with a transparent protective foil.

Figure 18 is a cross-section somewhat enlarged taken along the line 18—18 in Figure 17.

Figure 19 is a longitudinal section further enlarged taken on the line 19—19 in Figure 17.

Figure 20 is a still further enlarged partial view of the section shown in Fig. 19.

Figure 7:
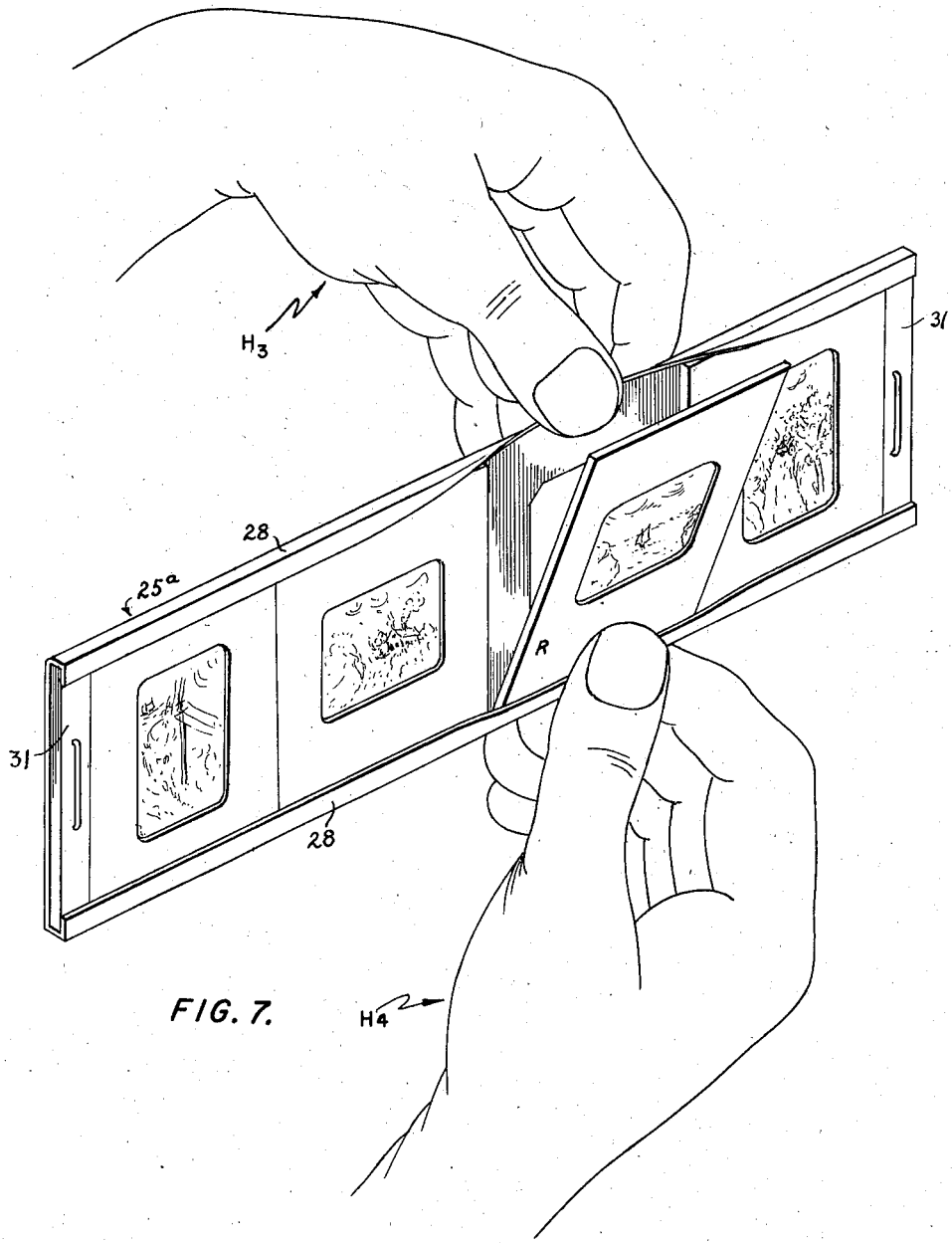
Fig. 7 is a perspective view of a holder strip loaded with slides similar to Fig. 6, although illustrating the manipulation with respect to the insertion and removal of one of the intermediate slides.

In Figures 1, 2, 3 a picture strip 10, that is a holder strip in which the slides have been assembled, having transparency frames 11, is shown horizontally inserted in the slide holder guide 12 of a still projector 13 comprising a housing 14 for the light source and a tubular lens carrier 15. The lens carrier is fixed to the guide 12 which in turn is fastened to the housing as by screws 16 and 17. An upper flat spring 18 and a lower flat spring 19 within the guide are also shown to be fastened to the housing as by screws 19a to hold the picture strip flat against the guide.

To indicate the manner in which the picture strips can be assembled in a compact and handy "library," Fig. 4 shows a box 20 containing a collection of picture strips 10, and provided with a releasable front wall 21 hinged to the bottom as at 22 and having at each side a snap fastening member 23 to catch upon a pin 24 or the like provided on the side walls 25 of the box.

One embodiment of a holder strip or slide mounting 25a according to Figs. 5 and 6 is shown to comprise a flat body portion 26 having picture apertures 27. Each longitudinal edge portion of the strip forms a groove 28 providing an overhang to retain therein a row of slides or film transparency frames 29 comprising a cardboard frame 29a holding the transparency such as a 35 mm. color film 29b. Each groove 28 comprises a transverse or bottom portion 30 and an overhanging slide retaining flange portion 30a. The picture openings 27 are spaced from one another a distance substantially equal to the width of a slide in such a manner as substantially to match up with the transparencies when the frames 29 are placed edge to edge and the row of frames is endwise confined as by stop means or end-confining members 31 shown to be fastened to the flat body portion 26 of the strip as by a clip 32. The end confining member in this embodiment is in the form of a transversely extending strip herein also called an abutment strip the ends 31a of which lodge within the corresponding end portions of the grooves 28.

A transparency frame 29 can be inserted in the holder strip or be removed therefrom in the manner indicated in Figs. 5 and 6; namely, by sufficiently deforming or flexing one of the slide-retaining edge portions 28, since the strip consists of resiliently deformable sheet material for instance in the nature of some suitable filmlike sheet plastic. A thermoplastic material in the nature of a cellulose acetate lends itself to this purpose. This manipulation is indicated by the operators hand H1 flexing the upper edge portion while the other hand H2 holds the lower edge portion of the holder strip, as a slide or transparency 29 is being released.

The embodiment of the holder strip shown in Fig. 7 is the same as that in Fig. 6, but illustrates the manipulation whereby one of the intermediate transparency frames such as the frame "R" is removed or inserted by hands H3 and H4 through resilient deformation or flexure of an intermediate portion of the overhang 28, as contrasted with the Fig. 6 condition where a frame 29a at the end of the holder strip is shown as being removed or inserted.

A holder strip or slide mounting as shown in

Figure 8:
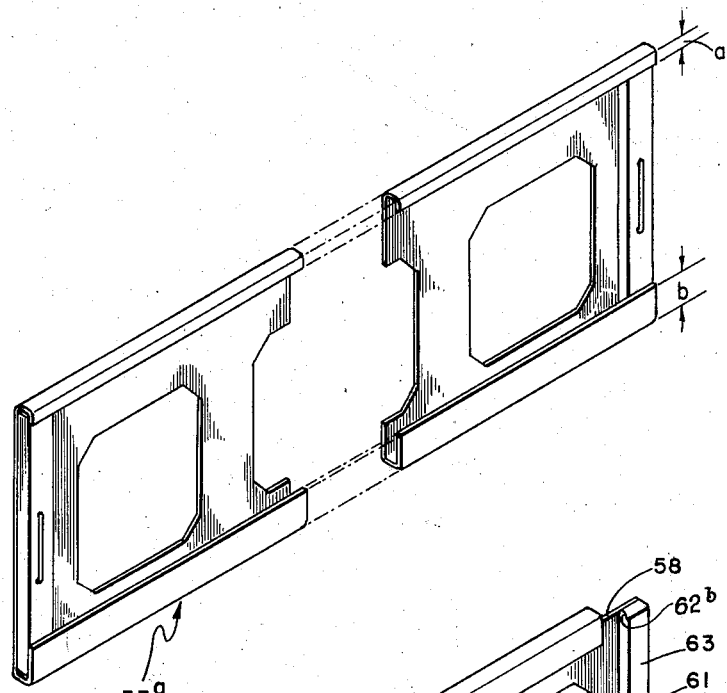
Fig. 8 is a perspective view of the holder strip similar to that of Figures 5 and 6 although empty.

Fig. 8 is similar to the one shown in Figures 5 and 6 except for having the one overhang *a* narrower than the opposite overhang *b*.

Figure 9:
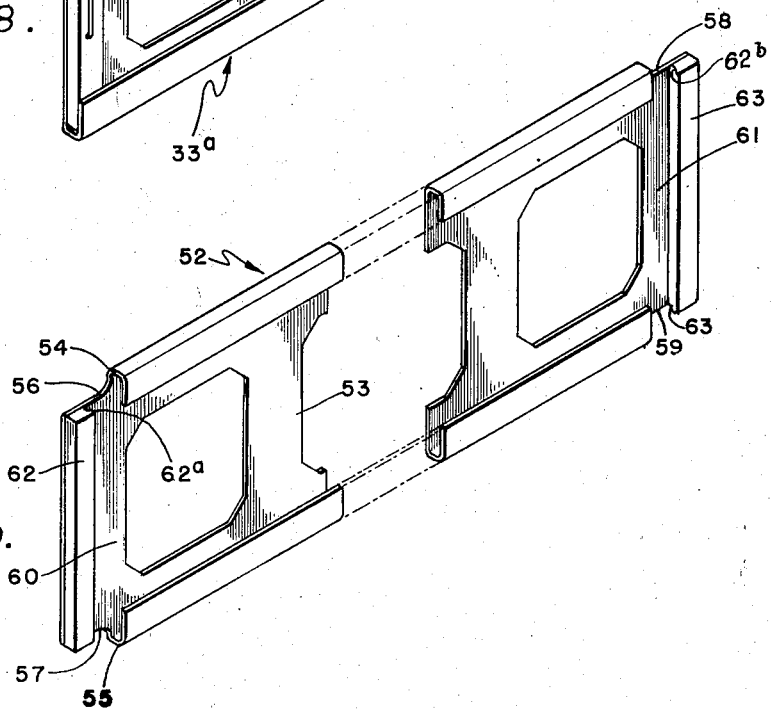
Fig. 9 is a perspective view of an empty holder strip comprising modified stop means.

A holder strip or slide mounting in Fig. 9 has an apertured body portion 53 and groovelike edge portions 54 and 55, and corner recesses 56, 57, 58, 59, forming tonguelike portions 60 and 61 at the ends of the strip. The ends are formed by ledge portions or transversely extending abutment strips 62 and 63 respectively fixed as by cementing to the tongue portions, each of these ledge portions having an inside overhang 62ª and 62ᵇ respectively adapted to engage and hold an adjoining edge portion of a slide or frame.

Figures 10 to 16 are substantially self-explanatory in that they pictorially present characteristics of deformability or flexure of the holder strip or slide mounting. Fig. 10 shows an empty holder strip 76ª in the form of a sheath provided at each end with a stop member 76ᵇ, twisted about the longitudinal axis. Figures 11 and 12 along with the cross-sections thereof in Figures 14, 15 and 16 indicate such deformations of the holder strip as might occur incident to the insertion of a slide into or its removal from the holder strip. Figures 11 and 12 illustrate what may be called a compound flexure of the holder, namely an outward flexure of a portion R of an overhang along with a slight or shallow transverse flexure of the holder strip as indicated by the angle A.

Fig. 17 shows a holder strip 77 similar to that in Figures 5 and 6, in combination with a transparent protective sheet or foil 78 provided in the holder strip so that the ends 78ª and 78ᵇ of the foil are tucked under the end confining members 79 and 80 respectively or are interposed and held between the body portion of the holder strip and the stop members 79 and 80. Thus the body portion of the holder strip comprises transparent portions allowing the slides to be viewed therethrough. The transparency frames can then be placed in the holder strip so that the emulsion 81 indicated in Fig. 20 on the transparency film 82 faces the protective transparent foil 78, such position of the transparency being indicated by the frame marked 83 shown in the extreme end portion of the holder strip.

I claim:

1. A slide mounting comprising a sheath of relatively thin and resiliently flexible filmlike material having a longitudinal body portion provided with a plurality of picture openings spaced from one another a distance substantially equal to the width of a slide, and having longitudinal edge portions providing substantially flat overhangs extending towards each other to constitute slide-retaining grooves, and stop means at each end of the body portion for maintaining between them a plurality of individual slides edgewise adjoining one another and confined in place within said sheath and in substantial registry with said openings by said slide retaining grooves and said stop means together with the edgewise adjoining relationship of the individual slides, said sheath being sufficiently deformable to allow for a resilient outward flexure of a portion of the length of an overhang whereby a slide may be inserted into or released from the sheath across said edge portions at the place of such flexure.

2. A slide mounting according to claim 1, in which the material is sheet plastic.

3. A slide mounting according to claim 1, in which the stop means comprise a strip extending transversely of and fastened to the body portion of the sheath.

4. A slide mounting according to claim 1, in which the stop means comprise an abutment strip extending transversely of the body portion of the sheath and having the portion intermediate its end portions fastened to said body portion, said end portions lodging within respective adjacent end portions of the longitudinal slide retaining grooves.

5. A slide mounting according to claim 1, in which the stop means comprise a tongue-like portion forming a terminal portion of said body portion and extending beyond the adjacent ends of the grooves, and provided with a confining portion for the free edge of an adjacent slide.

6. A slide mounting according to claim 1, in which the stop means comprise a transversely extending abutment strip for the adjacent slide, said strip being cemented to said body portion.

7. A slide mounting according to claim 1, in which the stop means comprise a tongue portion forming a terminal portion of said body portion and extending beyond the adjacent ends of the longitudinal grooves, and a transversely extending strip cemented to said tongue portion.

8. A slide mounting according to claim 1, in which the stop means comprise a transversely extending abutment strip at each end of the body portion and fastened thereto, the inner edge portion of each abutment strip having clearance with respect to the adjacent inner face of the body portion, with the addition of a transparent foil face to face with the inner face of the body portion and extending over said openings and having its ends lodge in the respective clearances between said abutment strips and said body portion.

9. A slide mounting according to claim 1, with the addition of a transparent foil associated face to face with the inner face of said body portion and extending over said openings and within the slide retaining grooves thereof.

10. A slide mounting according to claim 1, with the addition of a transparent protective foil associated face to face with the inner face of said body portion and extending over the openings thereof, said stop means having means for retaining the corresponding adjoining end portions of said foil face to face with said body portion.

11. The combination comprising a slide mounting according to claim 1, with a plurality of slides inserted therein and a transparent foil extending over said openings and interposed between said slides and said body portion.

12. The combination comprising a sheath of relatively thin and resiliently flexible filmlike material having a longitudinal body portion provided with a plurality of picture openings spaced from one another a distance substantially equal to the width of a slide, and having longitudinal edge portions providing substantially flat overhangs extending towards each other to constitute slide retaining grooves, said sheath being sufficiently deformable to allow for a resilient outward flexure of a portion of the length of an overhang whereby a slide may be inserted into or released from the sheath across said edge portions at the place of such flexure, stop means at each end of the body portion, and a plurality of individual slides edgewise adjoining one another and confined in place within said sheath and in substantial registry with said openings by said slide retaining grooves and said stop means together with the edgewise adjoining relationship of the individual slides whereby the assembly acquires a degree of stiffness significantly greater than that of the sheath when empty.

13. A slide mounting comprising a sheath of relatively thin and resiliently flexible filmlike material having a longitudinal body portion, and having longitudinal edge portions providing substantially flat overhangs extending towards each other to constitute slide-retaining grooves, and stop means at each end of the body portion for maintaining between them a plurality of individual slides edgewise adjoining one another and confined in place within said sheath by said slide-retaining grooves and said stop means together with the edgewise adjoining relationship of the individual slides, said body portion comprising transparent portions allowing said slides to be viewed therethrough, said sheath being sufficiently deformable to allow for a resilient outward flexure of a portion of the length of an overhang whereby a slide may be inserted into or released from the sheath across said edge portions at the place of such flexure.

14. A slide mounting according to claim 13, in which the stop means comprise a transversely extending abutment strip fastened to said body portion.

15. A slide mounting according to claim 13, in which the stop means comprise an abutment strip extending transversely of the body portion and having a portion intermediate its end portions fastened to the body portion of the sheath, said end portions lodging within respective adjacent end portions of the slide-retaining grooves.

16. A slide mounting according to claim 13, in which the stop means comprise a transverse abutment strip for the adjacent slide, said transverse strip being cemented to said body portion.

17. The combination comprising a sheath of relatively thin and resiliently flexible filmlike material having a longitudinal body portion, and having longitudinal edge portions providing substantially flat overhangs extending towards each other to constitute slide retaining grooves, said sheath being sufficiently deformable to allow for a resilient outward flexure of a portion of the length of an overhang whereby a slide may be inserted into or released from the sheath across said edge portions at the place of such flexure, stop means at each end of the body portion, and a plurality of individual slides edgewise adjoining one another and confined in place within said sheath by said slide-retaining grooves and said stop means together with the edgewise relationship of the individual slides whereby the assembly acquires a degree of stiffness significantly greater than that of the sheath when empty, said body portion comprising transparent portions allowing said slides to be viewed therethrough.

THEODORE M. JABLON.

REFERENCES CITED

The following references are of record in the file of this patent:

UNITED STATES PATENTS

| Number | Name | Date |
| --- | --- | --- |
| 1,730,883 | Grant | Oct. 8, 1929 |
| 1,787,308 | Furlong | Dec. 30, 1930 |
| 1,863,633 | Melind | June 21, 1933 |
| 1,733,215 | Barry | Oct. 29, 1929 |
| 1,904,318 | Lehere | Apr. 18, 1933 |
| 1,018,230 | Battershall et al. | Feb. 20, 1912 |
| 2,234,427 | Cox | Mar. 11, 1941 |
| 1,542,120 | Widre | June 16, 1925 |
| 2,271,530 | Wick | Feb. 3, 1942 |
| 2,012,501 | Erickson et al. | Aug. 27, 1935 |

FOREIGN PATENTS

| Number | Country | Date |
| --- | --- | --- |
| 546,010 | Great Britain | June 23, 1942 |